Figure 1:
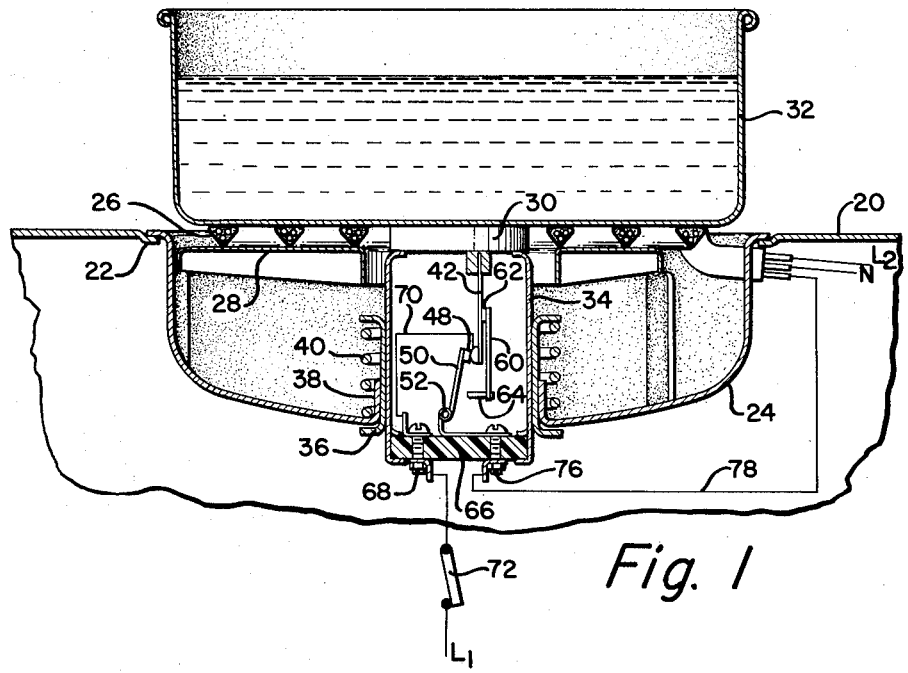

May 11, 1954    M. E. FRY    2,678,379
DOMESTIC APPLIANCE
Filed May 14, 1953

INVENTOR.
Millard E. Fry
BY R. K. Candor
His Attorney

Patented May 11, 1954

2,678,379

UNITED STATES PATENT OFFICE 2,678,379

DOMESTIC APPLIANCE

Millard E. Fry, Dayton, Ohio, assignor to General Motors Corporation, Detroit, Mich., a corporation of Delaware Application May 14, 1953, Serial No. 354,953

8 Claims. (Cl. 219—43)

This invention relates to a domestic appliance and more particularly to controls for liquids to be boiled.

In domestic cooking and in industrial appliances it is often desirable to stop or reduce the heating when a liquid reaches its boiling point. This is extremely difficult to do by the use of an ordinary thermostat.

It is an object of my invention to provide a control responsive to the attainment of boiling conditions.

It is another object of my invention to provide a control which is responsive to the attainment of boiling conditions of any liquid boiling within a reasonable range of temperatures.

It is another object of my invention to provide a control responsive to the continuous maintenance of a substantially constant elevated temperature after a continuous temperature rise.

It is another object of my invention to provide a two-element temperature control in which the difference in the rate of heat transfer to the two elements is used to measure and detect the difference between the temperature rise and the attainment of a constant elevated temperature.

These and other objects are attained in the form shown in the drawing by providing a first cantilever bimetal strip anchored to a block of good heat conducting material which is spring pressed into contact with the central portion of a pan resting on a surface heating unit of an electric range. The end of this bimetal is provided with an insulated contact normally engaged by the contact at the end of a pivoted contact arm. This pivoted contact arm is arranged at an angle to the first bimetal when the first bimetal is in the cold position. A second bimetal is connected in poor heat conducting relationship with the first bimetal at an intermediate point. The second bimetal has an operating projection which will not engage and move the contact arm until both the second and the first bimetals reach substantially the same elevated temperature.

Further objects and advantages of the present invention will be apparent from the following description, reference being had to the accompanying drawings wherein a preferred form of the invention is clearly shown.

Figure 2:
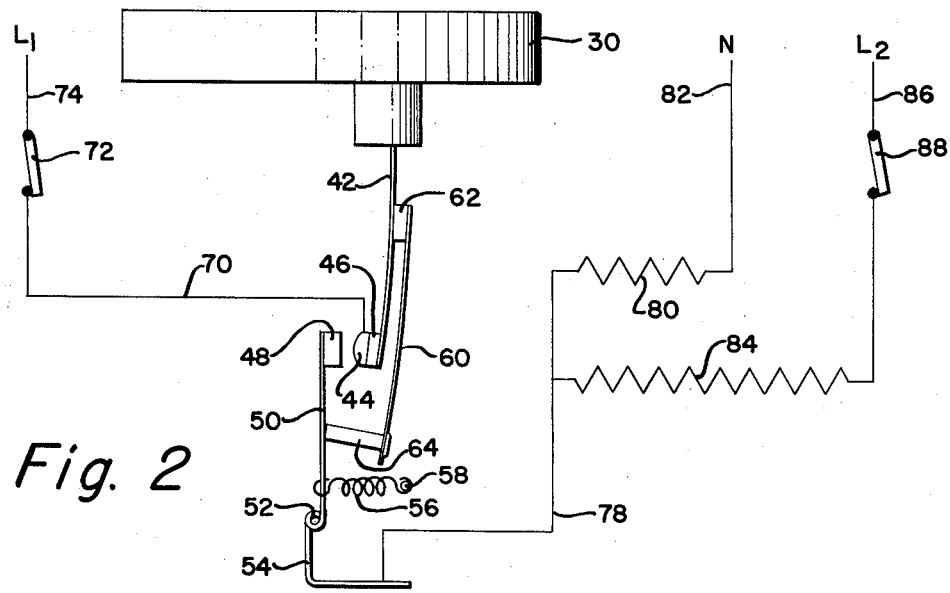

In the drawing:

Figure 1 is a vertical sectional view through a surface heating unit of an electric range illustrating one form of my invention in the cold condition; and Figure 2 is a wiring diagram illustrating the position of my invention when the boiling point is attained.

Referring now to the drawing and more particularly to Figure 1 there is shown a fragmentary portion 20 of the top of an electric range. This top 20 is provided with a flanged surface unit aperture 22 containing a drip pan 24 and a surface heating unit 26 supported upon the support 28 within the pan 24.

Located within the central portion of the electric surface heating unit 26 is a thermal contact member 30 of good heat conducting material. This contact member 30 is resiliently held against the central portion of the bottom of a vessel 32 adapted to contain water or other liquid to be boiled. For this purpose the contact member 30 is connected to a cylindrical radiation sleeve 34 provided with a concentric double flanged spring retainer 36 slidably mounted in the flanged centrally located aperture 38 in the bottom of the drip pan 24. This radiation sleeve 34 shields the control from the direct radiant heat of the unit 26. The spring retainer 36 and the cylindrical sleeve 34 and the contact member 30 are spring pressed upwardly at all times by the compression type coil spring 40 located between the upper flange of the spring retainer 36 and the bottom of the pan 24, as shown in Figure 1. The bottom flange of the spring retainer 36 serves as a stop to limit the upward movement of the sleeve 34 and the contact member 30.

According to the present invention, the bottom of the thermal contact member 30 forms the anchorage for a first cantilever bimetal strip 42 carrying a contact 44 at its lower free end which is preferably insulated by the insulation piece 46 as shown in Figure 2. The contact 44 is adapted to make contact with a contact 48 provided at the free end of a swinging arm 50 pivoted by a pin 52 to an anchorage 54 in such a manner that the arcs described by the contacts 44 and 48 intersect but are of reverse curvature.

The pivot point 52 is offset relative to the bimetal 42 in the direction of movement of the bimetal 42 when it is heated. A light coil spring 56 has one end connected to the lower portion of the pivoted contact member 50 and its other end anchored to a stationary pin 58 so as to yieldingly hold the contacts 44 and 48 in engagement as shown in Figure 1. When the bimetal strip 42 is cold, the swinging arm 50 angles toward it.

A second cantilever bimetal strip 60 is also provided having poor heat transfer with the vessel 32. Preferably the upper end of this bimetal strip 60 is anchored to a block 62 of poor heat conducting material which is fastened to and mounted upon a portion of the strip 42 intermediate the contact member 30 and the contact 44. Preferably the cantilever bimetals 42 and 60 are of the same length and temperature responsive characteristics so that when both are at the same temperature they will remain parallel in the arrangements shown. The lower end of the cantilever bimetal 60 is provided with an operating pin 64 of an electrical insulating material. This pin 64 may be riveted or otherwise fastened to the bimetal strip 60. Because of the angularity of the contact member 50 toward the strip 42 the pin 64 will be out of contact with it when both bimetals are cool as shown in Figure 1.

The cylindrical member 34 is provided with a base 66 of an electrical insulating material to which the anchorage 54 is fastened by a bolt 76. This base is provided with an electrical terminal 68 connected by a conductor 70 with the contact 44. The conductor 70 is also connected to a manual control switch 72 in turn connected to one of the live supply conductors 74 of a three-wire Edison circuit. The pivot anchorage 54 is connected by the electrical terminal structure 76 extending through the base 66 and connected to the conductor 78 which in turn is connected to the electrical heat unit 26. The electric heating unit 26 includes two heating elements 80 and 84 connected to the conductor 78. One of these heating elements 80 is connected to the neutral supply conductor 82 of the Edison supply circuit while the other heating element 84 is connected through a switch 88 to the remaining live supply conductor 86 of the Edison supply circuit. The opening of both switches 72 and 88 will completely deenergize the heater 26.

In operation when the switches 72 and 88 are closed, current will flow from the supply conductor 74 through the switch 72 and the conductor 70 to the contact 44. The angularity of the contact member 50 toward the strip 42 avoids contact with the pin 62 and allows the spring to hold the contacts 44 and 48 in contact. From the contact 44, the current will flow to the contact 48 and through the pivoted contact carrying member 50, the pivot 52, the anchorage 54, the terminal arrangement 76 and the conductor 78 to the heating elements 80 and 84 in parallel which connect to the supply conductors 82 and 86. The heating unit 26 will rise in temperature and this heat will be transmitted to the vessel 32 to gradually raise the temperature of the liquid in the vessel 32. As the temperature rises, this increase in temperature will be transmitted to the first cantilever bimetal 42. This bimetal 42 will gradually deflect to the left carrying with it the contacts 44 and 48 as well as the insulating block 62.

The temperature of the second cantilever bimetal strip 60 will lag considerably behind the rise in temperature of the bimetal 42 because of the poor heat transmission between the element 30 and the bimetal strip 60 primarily because of the block 62 and also because of its mounting upon the bimetal 42. The bimetal strip 60 during the rise in temperature of the vessel 32 will therefore tend to remain straight longer and will curve to the left at a slower rate than the bimetal 42. The curving of the bimetal 42 under a rise in temperature will cause the pivoted member 50 to move to a more vertical position. The curving of the bimetal 42 will also move the bimetal strip 60 and its pin 64 closer to contact with the pivoted contact member 50.

The pin 64 is made of such a length that it will not engage the contact member 50 until first the bimetal strip 42 has reached an elevated temperature and secondly the bimetal strip 60 has reached substantially the same elevated temperature as the bimetal strip 42. When these two conditions are satisfied, the bimetal strips 42 and 60 curve in parallel arcs with substantially the same curvature and the operating pin 64 will engage the pivoted contact member 50 and force it to the left to separate the contacts 44 and 48 as shown in Figure 2 to deenergize the conductor 78. The heating elements 80 and 84 are then connected in series across the supply conductors 82 and 86 to provide a low output from the heating unit 26. This low output supplies enough heat to substantially maintain boiling temperatures in the vessel 32 without violent or active boiling.

Although in the cold condition shown in Figure 1 the bimetal strips 42 and 60 are at substantially the same temperature, the pin 64 is clearly out of contact with the pivoted contact member 50 because the pivoted contact member 50 angles toward the insulated contact 44 and this insulated contact 44 holds the pivoted member 50 out of contact with the operating pin 64. As the temperature increases the insulated contact 44 will carry both the pivoted contact member 50 and the second cantilever bimetal strip 60 to the left so that the strip 42 and the pivoted member 50 become substantially parallel and the pin 64 and the portion of the pivoted contact member 50 adjacent thereto are brought closer together. However, contact of the pin 64 with the pivoted contact member 50 is not made until after the first cantilever bimetal strip 42 has reached the boiling temperature of the liquid in the vessel 32 and the bimetal strip 60 substantially approaches the temperature of the first bimetal 42 curves sufficiently to cause the pin to engage the contact member 50 and separate the contacts 44 and 48.

The lag in temperature rise of the strip 60 relative to the rise in temperature of the strip 42 and the contact member 30 may be obtained without the specific connections shown merely by making the strip 60 of greater mass or by using other means of reducing its thermal conductivity with the member 30.

Although the contact member 50 is shown connected by a pivot pin to its anchorage 54 the pivotal connection may be made by the use of a leaf spring or simply by the resilient bending of the contact member 50.

In accordance with the provisions of rule 78a, reference is made to the following prior filed application, Serial Number 171,096.

While the form of embodiment of the invention as herein disclosed constitutes a preferred form, it is to be understood that other forms might be adopted as may come within the scope of the claims which follow.

What is claimed is as follows:

1. In combination, a heating means, a means to be heated, a first thermal means in good heat transfer relationship with the means to be heated, a second thermal means in poor heat transfer relationship with the means to be heated, a control means for controlling said heating means, said first thermal means having means for changing the relationship between the second thermal means and said control means, said second thermal means having means for operating said control means.

2. In combination, a first thermal means having a movable portion, a second thermal means operatively connected to and located by said first thermal means, said second thermal means having a heat transfer flow delaying connection with said first thermal means, a control means having one portion adapted to be operatively connected to and moved by said first thermal means, said control means having a second portion adapted to be operatively connected and moved by said second thermal means, said control means having an interconnection between said one portion and said second portion and a swinging arrangement to cause said one portion to move at a greater rate than said second portion.

3. In combination, a first thermal means having a movable portion, a second thermal means operatively connected to and located by said first thermal means, said second thermal means having a heat transfer flow delaying connection with said first thermal means, a control means having one portion adapted to be operatively connected to and moved by said first thermal means, said control means having a second portion adapted to be operatively connected and moved by said second thermal means, said control means having an anchorage and a swinging arrangement between said anchorage and said portions, said portions being located at different distances from said anchorage to cause them to move at different rates.

4. In combination, a first bimetal means having an anchored portion and a movable portion, a second bimetal means having a portion anchored to an intermediate portion of the first bimetal means and a movable portion, a swinging control means having a movable portion adjacent the movable portions of the first and second bimetal means, said control means having its swinging connections on the opposite side of its movable portion from said bimetal means, said first bimetal means having means providing an operative connection with a portion of greater radius upon said swinging control means and said second bimetal means having means providing an operative connection with a portion of lesser radius upon said swinging control means.

5. In combination, a first cantilever bimetal means having an anchored portion adapted to be heated and cooled and a movable end portion provided with a contact means, a second cantilever bimetal means having an anchored portion anchored to an intermediate portion of said first bimetal means, the anchorage of said second bimetal means including a heat transfer barrier between said second bimetal means and the first bimetal means, a movable control member having a contact portion adapted to make contact with said contact means, means for causing said contact portion to move in an arc which is the reverse of the arc of the first bimetal means, said second bimetal means having means for making an operative connection with a portion of said control member having a smaller arc of movement than said contact portion.

6. In combination, a first cantilever bimetal means having an anchored portion adapted to be heated and cooled and a movable end portion provided with a contact means, a second cantilever bimetal means having an anchored portion anchored to an intermediate portion of said first bimetal means, the anchorage of said second bimetal means including a heat transfer barrier between said second bimetal means and the first bimetal means, a movable control member having a contact portion adapted to make contact with said contact means, means for causing said contact portion to move in an arc which is the reverse of the arc of the first bimetal means and for locating said movable control member so that it extends at an intersecting angle to the first bimetal means when said first bimetal means is in a cold condition.

7. In combination, a heating means, a means to be heated, a first thermal means thermally associated with said heating means, a second thermal means thermally associated with said heating means, the mass and thermal conductivity of the association of said thermal means with said heating means being proportioned to cause the temperature of the first thermal means to rise more rapidly than the second thermal means as the temperature of said heating means rises, a control means for controlling said heating means, said first thermal means having means for changing the relationship between the second thermal means and said control means, said second thermal means having means for operating said control means.

8. In combination, a heating means, a means to be heated, a first thermal means thermally associated with said heating means, a second thermal means thermally associated with said heating means, the mass and thermal conductivity of the association of said thermal means with said heating means being proportioned to cause the temperature of the first thermal means to rise more rapidly than the second thermal means as the temperature of said heating means rises, a control means having one portion adapted to be operatively connected to and moved by said first thermal means, said control means having a second portion adapted to be operatively connected and moved by said second thermal means, said control means having an interconnection between said one portion and said second portion and a swinging arrangement to cause said one portion to move at a greater rate than said second portion.

No references cited.